United States Patent
Steinberg et al.

[11] Patent Number: 6,155,682
[45] Date of Patent: Dec. 5, 2000

[54] APPARATUS AND METHODS FOR IMPROVING VISION DAMAGED BY RETINAL DETERIORATION

[76] Inventors: Stanley P. Steinberg, 2660 Peachtree Rd. NW., Suite 15G, Atlanta, Ga. 30305; Gordon E. Liljegren, 1030 Amherst Dr., Burbank, Calif. 91504; David A. Saperstein, 1085 Saint Charles Pl., Atlanta, Ga. 30306

[21] Appl. No.: 09/274,495
[22] Filed: Mar. 23, 1999
[51] Int. Cl.⁷ ........................................ A61B 3/10
[52] U.S. Cl. ..................... 351/205; 351/221; 623/4
[58] Field of Search ........................ 351/205, 211, 351/221, 246, 57; 623/4

[56] References Cited

U.S. PATENT DOCUMENTS

| | | | |
|---|---|---|---|
| 4,581,031 | 4/1986 | Koziol et al. | 623/6 |
| 4,666,446 | 5/1987 | Koziol et al. | 623/6 |
| 4,772,113 | 9/1988 | Parker | 351/57 |
| 5,030,231 | 7/1991 | Portney | 623/6 |

*Primary Examiner*—George Manuel
*Attorney, Agent, or Firm*—Fish & Neave; James Trosino

[57] ABSTRACT

Apparatus and methods for shifting an image back and forth between first and second portions of the retina are described. Apparatus constructed in accordance with principles of the present invention preferably include spectacles, a fixed mirror, a pivoting mirror, a drive motor coupled to the pivoting mirror, and control circuitry coupled to the drive motor, the control circuitry causing the drive motor to pivot between first and second positions to shift an image from a first to a second portion of the retina.

25 Claims, 5 Drawing Sheets

APPARATUS AND METHODS FOR IMPROVING VISION DAMAGED BY RETINAL DETERIORATION

FIELD OF THE INVENTION

The present invention relates generally to apparatus and methods for improving central vision that has been impaired due to retinal damage. More particularly, the present invention relates to apparatus and methods that continuously shift the line of sight back and forth between first and second portions of the retina to compensate for vision loss at the damaged portion.

BACKGROUND OF THE INVENTION

There are approximately 500,000 individuals in the United States whose vision in one or both eyes is impaired due to retinal deterioration or damage. Often, such injury primarily affects the central portion of the retina known as the macula, and results in what is commonly called central vision loss. In such cases, over 90% of the retina remains unharmed, and the peripheral vision remains intact. Such injury, however, is particularly disturbing because the macula provides acute vision, such as that needed for driving or reading. As a result, macular damage often causes an image either to appear distorted or invisible. For example, an individual with significant macular damage sees a blind spot at the center of vision and therefore is virtually unable to read printed text.

Standard eyeglass lenses commonly used to correct focusing problems are insufficient to restore proper vision to a patient suffering from macular degeneration. A variety of other previously known devices have been used to correct this problem. One such previously known device, for example, consists of telescopic systems that increase the retinal image size of an object. Such telescopic systems, however, merely increase image size, still require central vision to complete the image, and therefore, do not provide a congruent image.

To overcome problems associated with telescopic systems, other previously known devices include intricate intraocular lens systems that shift an image from a damaged to an undamaged area of the retina. For example, U.S. Pat. No. 4,581,031 to Koziol et al. (the Koziol '031 patent), describes an intraocular lens adapted to be implanted in the eye, the lens including a lens portion having a convex first portion, a second portion including a prism, and a means coupled to the lens for supporting the lens in the eye. In use, light rays strike the convex first portion, are focused, exit through the prism on the second portion and are deflected away from the macula towards and against the undiseased paracentral retinal area.

Other prior art devices include a combination of intraocular lenses and external spectacle lenses. For example, U.S. Pat. No. 4,666,446, also to Koziol et al. (the Koziol '446 patent), describes an intraocular lens adapted to be implanted in the eye and used with an external converging spectacle lens. The intraocular lens has a first portion including a diverging lens, a second portion including a converging lens, and a means coupled to the lens for supporting the lens in the eye. Use of the intraocular lens in combination with the converging spectacle lens provides a magnified retinal image of a given object, whereas use of the intraocular lens without the converging spectacle lens provides unmagnified and unrestricted peripheral vision.

U.S. Pat. No. 5,030,231 to Portney also describes an intraocular lens and a spectacle lens arrangement. The intraocular lens has a converging lens portion and a diverging lens portion that combines with multiple-element spectacles having anterior and posterior lenses arranged to converge light toward the diverging lens portion of the intraocular lens.

Other previously known lens systems are configured solely in eyeglasses. For example, U.S. Pat. No. 4,772,113 to Parker discloses eyeglasses that comprise two lens assemblies, each having a magnifying lens with two convex surfaces and a reducing lens with two concave surfaces. The reducing lens incorporates prism rings that focus an image or light onto an undamaged portion of the retina.

A disadvantage common to these and other previously known image shifting devices is that the shifted image remains fixed at one location. As a result, the eye naturally shifts the image back to the central area of the visual axis, which often is the damaged area of the macula. Also, many of these previously known devices suffer because the image appears to be distorted when viewed, or only a portion of the normal viewing area can be seen at one time.

In view of the deficiencies in previously known devices, it would be desirable to provide methods and apparatus for shifting an image from a first to a second portion of the retina while overcoming the eye's natural tendency to shift the image back to the first portion.

It further would be desirable to provide methods and apparatus for shifting an image back and forth between first and second portions of the retina.

It still further would be desirable to provide methods and apparatus for shifting an image back and forth between first and second portions of the retina at a rate sufficient to prevent the eye from shifting the image to the first portion of the retina.

It also would be desirable to provide methods and apparatus for allowing a person with macular degeneration to have an undistorted view of objects that could not previously be seen in undistorted form.

SUMMARY OF THE INVENTION

In view of the foregoing, it is an object of the present invention to provide methods and apparatus for shifting an image from a first to a second portion of the retina while overcoming the eye's natural tendency to shift the image back to the first portion.

It further is an object of the present invention to provide methods and apparatus for shifting an image back and forth between first and second portions of the retina.

It still further is an object of the present invention to provide methods and apparatus for shifting an image back and forth between first and second portions of the retina at a rate sufficient to prevent the eye from shifting the image to the first portion of the retina.

It also is an object of the present invention to provide apparatus and methods for allowing a person with macular degeneration to have an undistorted view of objects that could not previously be seen in undistorted form.

These and other objects of the invention are accomplished in accordance with the principles of the invention by providing apparatus and methods for shifting an image back and forth between first and second portions of the retina. Apparatus constructed in accordance with principles of the present invention preferably include spectacles, a fixed mirror, a pivoting mirror, a drive motor coupled to the pivoting mirror, and control circuitry coupled to the drive motor, the control circuitry causing the drive motor to pivot the pivoting mirror between first and second positions to shift an image from a first to a second portion of the retina.

BRIEF DESCRIPTION OF THE DRAWINGS

Further features of the invention, its nature and various advantages will be more apparent from the accompanying drawings and the following detailed description of the preferred embodiments, in which.

DETAILED DESCRIPTION OF THE PREFERRED EMBODIMENTS

The present invention relates generally to apparatus and methods for shifting an image back and forth between first and second portions of the retina at a rate sufficient to prevent the eye from shifting the image to the first portion of the retina. In an illustrative apparatus of the invention, a drive motor drives a pivoting mirror between a first position in which the image is directed to a first portion of the retina, and a second position in which the image is shifted a predetermined amount to a second portion of the retina.

Figure 1:
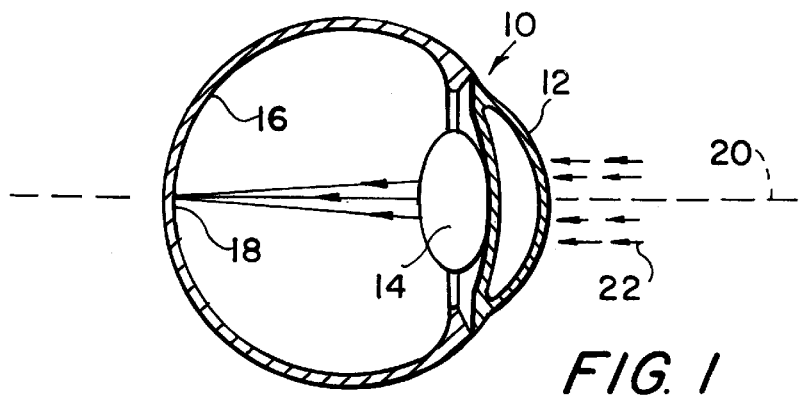
FIG. 1 is a side view in partial cross section of a human eye.

FIG. 1 illustrates a simplified diagram of the human visual system. Eye 10 includes cornea 12, lens 14, retina 16 and central area 18. Central area 18 is located on optical axis 20 at the center of retina 16, and provides acute vision, such as that necessary for reading and driving a car. Light rays 22 are focused on central area 18 by means of cornea 12 and lens 14. Thus, light rays 22 striking cornea 12 and lens 14 substantially perpendicular to eye 10 focus on central area 18, and provide acute vision, whereas light rays striking this system obliquely are unfocused and provide peripheral, less acute vision. When eye 10 experiences macular degeneration, visual acuity decreases, resulting in a blurred spot in the center of vision, although less acute peripheral vision remains substantially unchanged.

Figure 2:
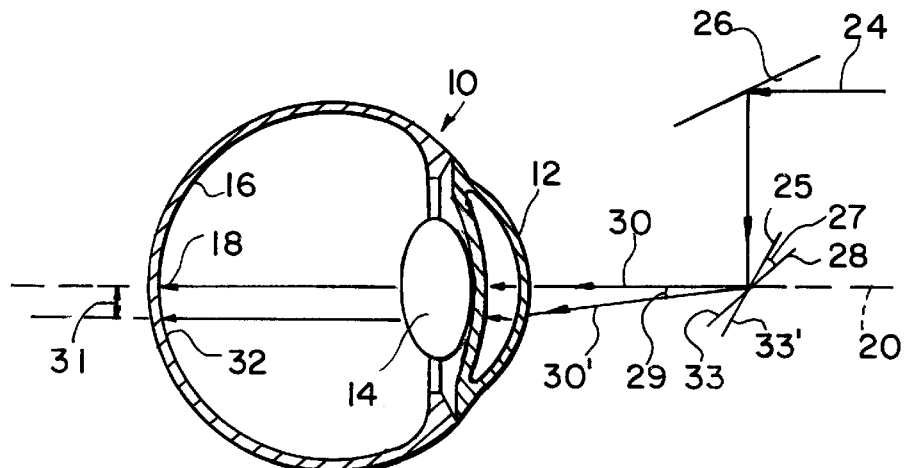
FIG. 2 is a side view in partial cross section of a human eye with a previously known apparatus for shifting an image.

FIG. 2 illustrates a previously known method for shifting an image by a predetermined amount on the retina using one fixed mirror and one pivoting mirror. Light ray 24 strikes fixed mirror 26, and is reflected as light ray 25 to pivoting mirror 28. Pivoting mirror 28 pivots between unpivoted position 33 and first pivoted position 33'. In unpivoted position 33, pivoting mirror 28 reflects light ray 25 as light ray 30 substantially on optical axis 20. Light ray 30 strikes cornea 12 and lens 14 and focuses on central area 18.

To shift incident light from central area 18 to an undamaged portion of retina 16, pivoting mirror 28 pivots by an amount equal to pivot angle 27 to first pivoted position 33'. In first pivoted position 33', pivoting mirror 28 reflects light ray 25 as light ray 30', at a deflection angle 29 below optical axis 20. Deflection angle 29 equals twice pivot angle 27. Light ray 30' strikes cornea 12 and lens 14 and focuses on undiseased area 32 at a distance 31 below central area 18.

Figure 3:
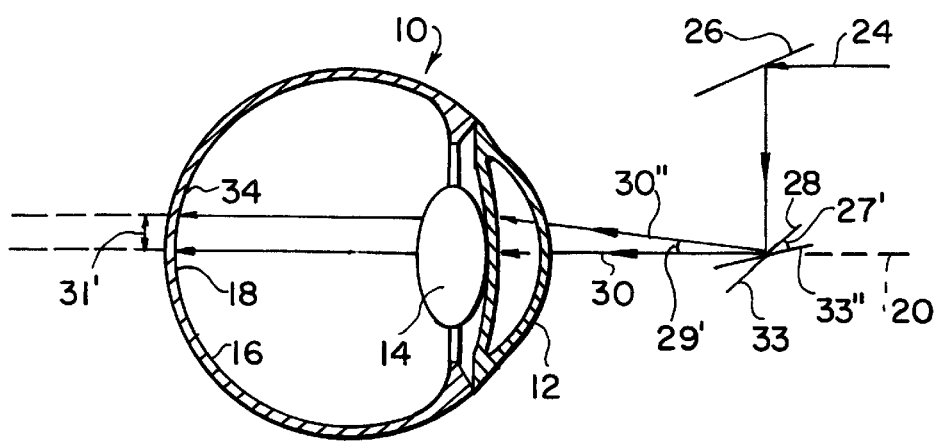
FIG. 3 is another side view in partial cross section of a human eye with a previously known apparatus for shifting an image.

FIG. 3 shows pivoting mirror 28 pivoting between unpivoted position 33 and second pivoted position 33". As shown in FIG. 3, by changing the position of pivoting mirror 28 by pivot angle 27' to second pivoted position 33", pivoting mirror 28 reflects light ray 25 as light ray 30", which is at deflection angle 29' above optical axis 20. Deflection angle 29' equals twice pivot angle 27'. Light ray 30" strikes cornea 12 and lens 14 and focuses on undiseased area 34 at a distance 31' above central area 18. If the magnitude of pivot angle 27 equals the magnitude of pivot angle 27', the magnitude of deflection angle 29 equals the magnitude of deflection angle 29', and distance 31 equals distance 31'.

If the apparatus of FIGS. 2 and 3 are used to slowly or statically shift an image from central area 18 to undiseased areas 32 or 34, the eye naturally shifts the image back to central area 18, which often is the damaged area of the macula. To overcome this effect, the present invention shifts the image back and forth between first and second portions of the retina at a rate sufficient to prevent the eye from shifting the image to the first portion of the retina.

Figure 4A:
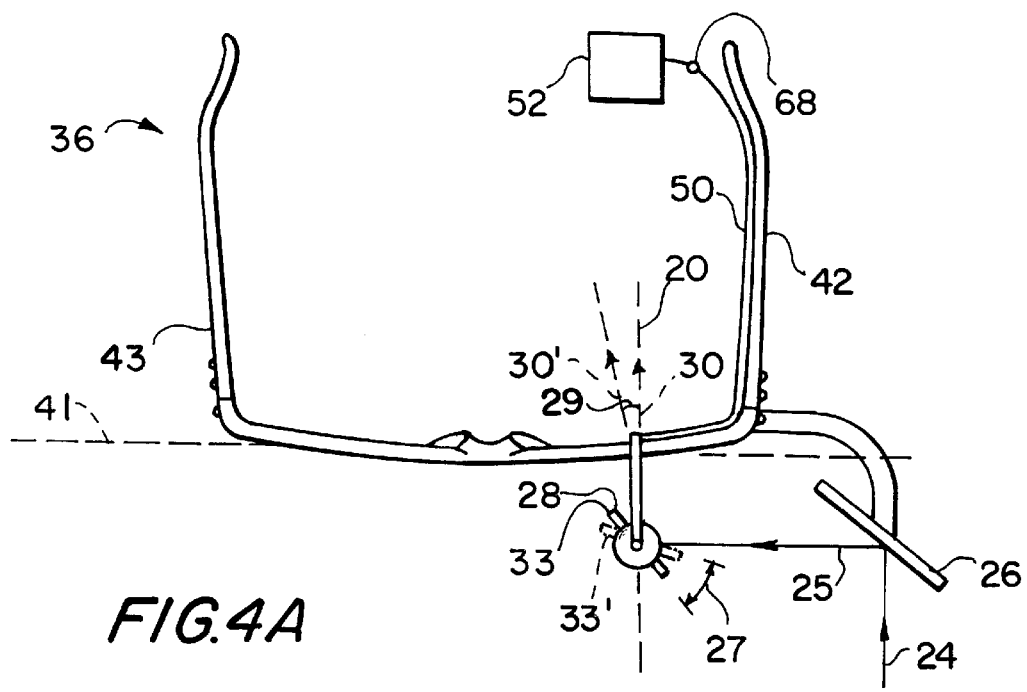
FIG. 4 is a top view of apparatus in accordance with the present invention.
Figure 4B:
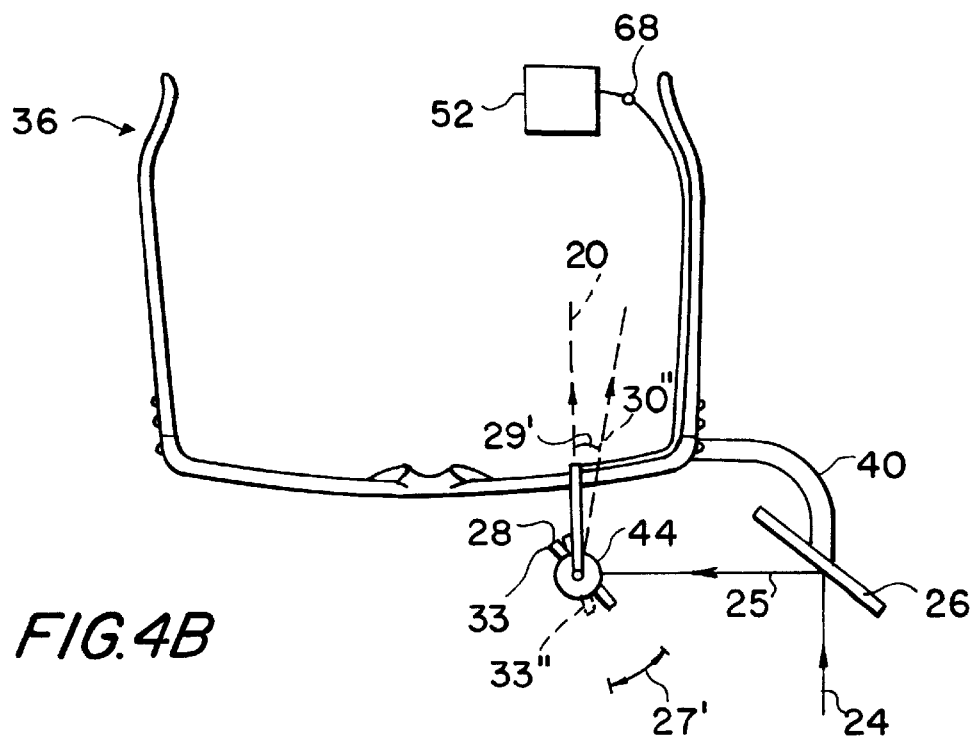
Figure 5:
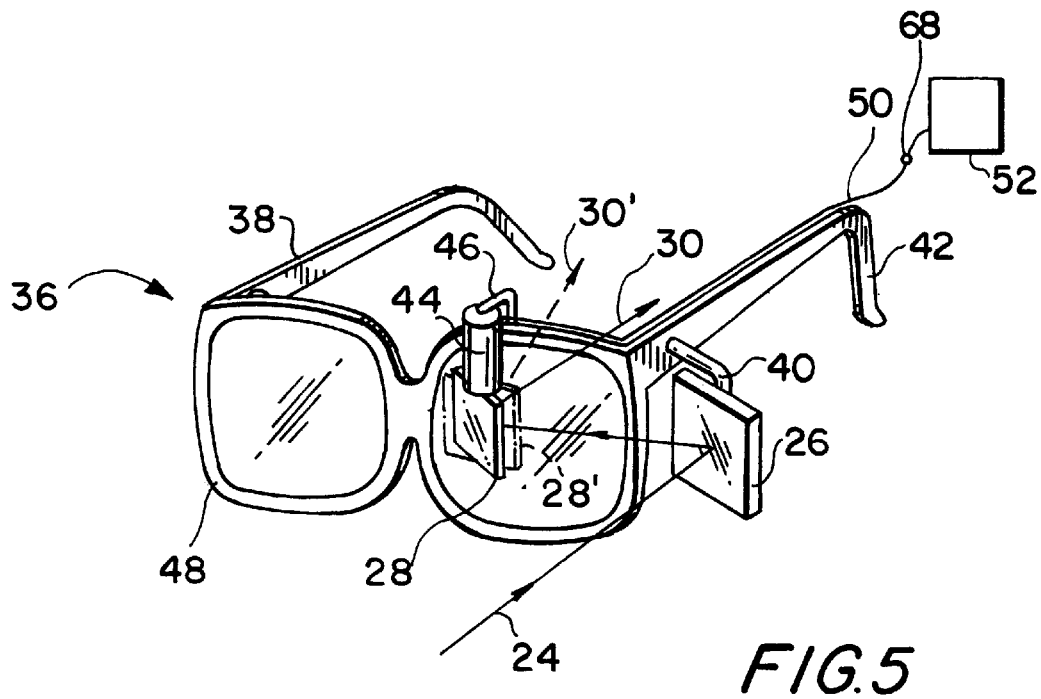
FIG. 5 is a perspective view of apparatus in accordance with the present invention.
Figure 6:
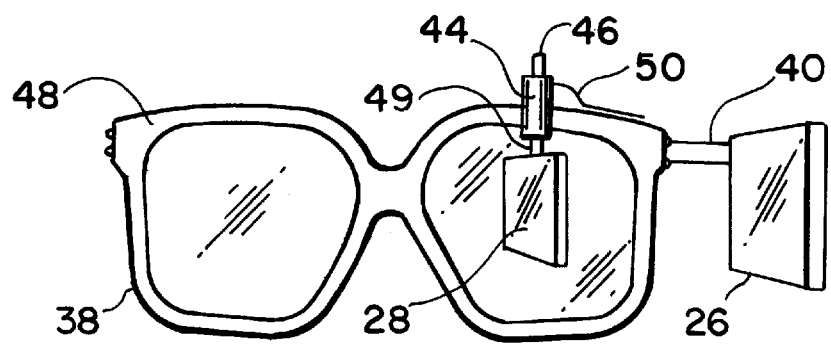
FIG. 6 is a front view of apparatus in accordance with the present invention.

Referring now to FIGS. 4–6, illustrative apparatus constructed in accordance with the present invention are described. Apparatus 36 includes fixed mirror 26, pivoting mirror 28, spectacles 38, arm 40, drive motor 44, arm 46, shielded wire 50 and control circuit 52. Spectacles 38 include side stems 42 and 43 and rim 48, and are standard lens support frames, such as eyeglasses, for rigidly holding a magnification lens in proper orientation with respect to the eye of a user. Spectacles 38 preferably are plastic to have light weight and provide sturdy support.

Arm 40 mounts fixed mirror 26 to spectacles 38. In particular, arm 40 couples at one end to side stem 42 and at the other end to a back surface of fixed mirror 26. The ends of arm 40 may be coupled to side stem 42 and fixed mirror 26 by any suitable fastening means, such as by fasteners, adhesives, or glues. Alternatively, arm 40 may be integrally formed with side stem 42, such as by injection molding. Fixed mirror 26 preferably is mounted at approximately a 45° angle relative to axis 41 of rim 48.

Drive motor 44 includes drive shaft 49 coupled to pivoting mirror 28. Arm 46 couples drive motor 44 to rim 48 such that drive shaft 49 substantially aligns with optical axis 20. Pivoting mirror 28 preferably is a very lightweight first surface scanning mirror, such as used in laser scanners.

The size of fixed mirror 26 and pivoting mirror 28 preferably should be selected to include within their range approximately the central 15% around optical axis 20. For example, fixed mirror 26 may be implemented using model number 32340, or model number 30623, both by Edmund Scientific Corp. of Barrington, N.J. (Edmund). Further, pivoting mirror 28 preferably should be sized to avoid obstructing the patient's entire field of vision, so that the patient's peripheral vision is not fully obstructed. For example, pivoting mirror 28 may be implemented using model number F32943 by Edmund.

Drive motor 44 responds to control signals to angularly displace drive shaft 49 by a predetermined amount. As used herein, drive motor 44 includes electro mechanical, pneumatic, hydraulic, or other similar means for angularly displacing drive shaft 49. For example, drive motor 44 may be a stepper motor that responds to direct current (DC) control signals, such as the Sankyo variable reluctance 2-phase stepper motor model MSAA02OA71, manufactured by Sankyo Seiki (America) Inc., Paramus, N.J.

Alternatively, drive motor 44 may be implemented using a galvanometer, such as a scanning-type galvanometer commonly used in laser scanning or positioning equipment. For example, drive motor 44 may be implemented using the Micro MO series scanner, manufactured by General Scanning Inc., Watertown, Mass. (General Scanning), or the model 6800 High Performance Optical Scanner, manufactured by Cambridge Technology Inc., Watertown, Mass.

Control circuit 52 generates drive signals used to control drive motor 44, and shielded wire 50 couples the drive signals from control circuit 52 to drive motor 44. Control circuit 52 is described in more detail below.

Figure 7:
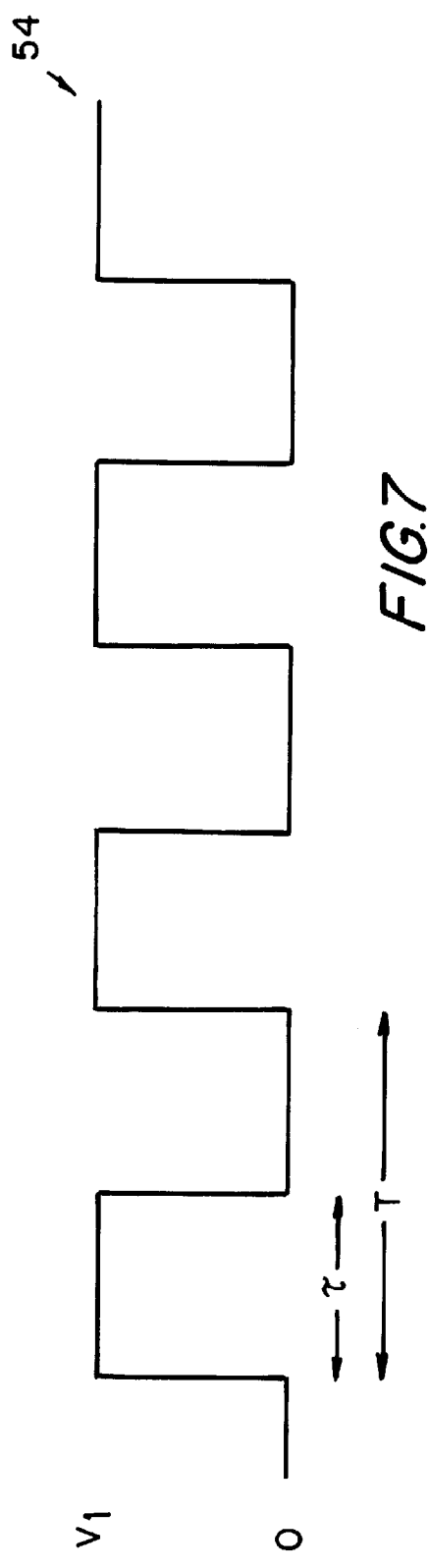
FIG. 7 is a diagram of a control signal in accordance with the present invention.
Figure 8:
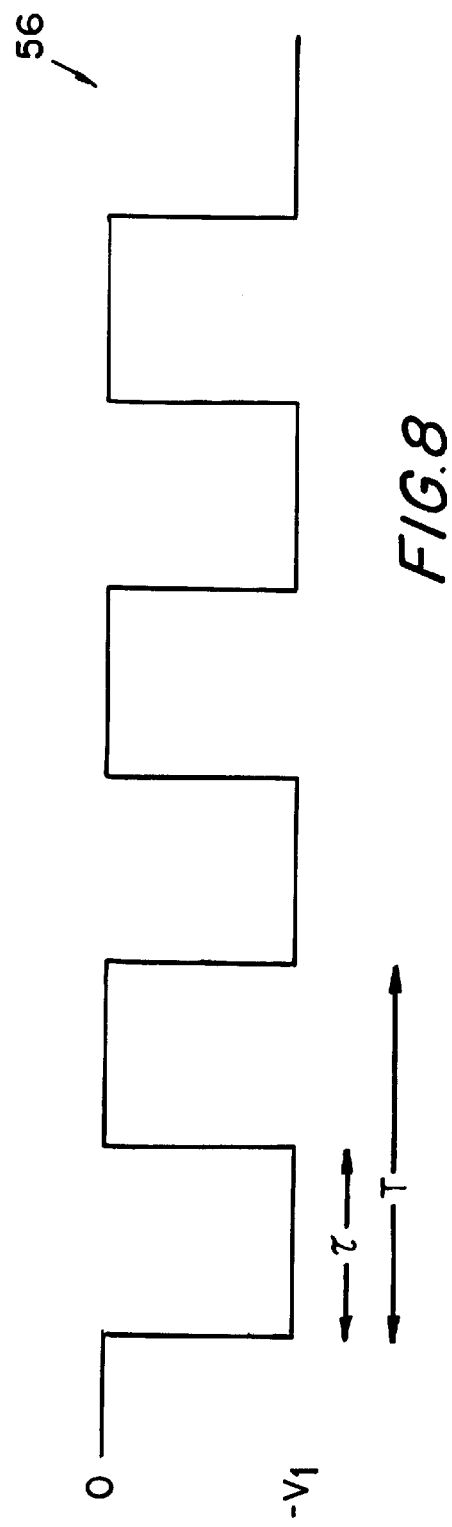
FIG. 8 is a diagram of a control signal in accordance with the present invention.

FIGS. 7 and 8 illustrate drive signals in accordance with the present invention. Drive signal 54 is a square-wave signal having a peak amplitude equal to $V_1$ volts, pulse duration T and pulse period T. The magnitude and sign of the pulse voltage controls the magnitude and sign of the angular rotation of drive shaft 49. That is, if the pulse voltage is 0 volts, drive shaft 49 positions pivoting mirror 28 at unpivoted position 33, and light ray 25 is reflected as light ray 30 along optical axis 20 (FIG. 4A). If, however, the pulse voltage is nonzero, drive shaft 49 rotates by an amount that is proportional to the magnitude of the pulse voltage, and in a direction equal to the sign (i.e., positive or negative) of the pulse voltage.

As shown in FIG. 7, drive signal 54 switches between 0 volts and $V_1$ volts. When the pulse amplitude is 0 volts, pivoting mirror 28 is in unpivoted position 33. When the pulse voltage is $V_1$ volts, drive motor 44 rotates drive shaft 49 by pivot angle 27, pivoting mirror 28 moves to first pivoted position 33', and light ray 25 reflects as light ray 30' (FIG. 4A). When the pulse voltage switches from $V_1$ to 0 volts, drive motor 44 rotates drive shaft 49 back by an amount equal to pivot angle 27, pivoting mirror 28 returns to unpivoted position 33, and light ray 25 is reflects as light ray 30 (FIG. 4).

Alternatively, as shown in FIG. 8, drive signal 56 is a square-wave signal having a negative peak amplitude equal to $-V_1$ volts, pulse duration T and pulse period T. The magnitude and sign of the pulse voltage controls the magnitude and sign of the angular rotation of drive shaft 49. If pulse voltage is 0 volts, drive shaft 49 positions pivoting mirror 28 at unpivoted position 33, and light ray 25 is reflected as light ray 30 along optical axis 20 (FIG. 4B). If, however, the pulse voltage is nonzero, drive shaft 49 rotates by an amount that is proportional to the magnitude of the pulse voltage, and in a direction equal to the sign (i.e., positive or negative) of the pulse voltage.

Drive signal 56 switches between 0 volts and $-V_1$ volts. When the pulse amplitude is 0 volts, pivoting mirror 28 is in unpivoted position 33. When the pulse voltage is $-V_1$ volts, drive motor 44 rotates drive shaft 49 by pivot angle 27', pivoting mirror 28 moves to second pivoted position 33", and light ray 25 reflects as light ray 30" (FIG. 4B). When the pulse voltage switches from $V_1$ to 0 volts, drive motor 44 rotates drive shaft 49 back by an amount equal to pivot angle 27, pivoting mirror 28 returns to unpivoted position 33, and light ray 25 is reflects as light ray 30 (FIG. 4B).

Although not shown in FIGS. 7 or 8, drive signals in accordance with the present invention also can be bipolar (i.e., the pulse amplitude can vary between positive and negative voltages). For example, the drive signal may be configured to vary between $+V_1$ and $-V_1$ volts (i.e., equal magnitudes and opposite polarity), so that pivoting mirror 28 pivots between first and second pivoted positions 33' and 33", respectively.

Alternatively, the drive signal may be configured to vary between $+V_x$ and $-V_y$ volts (i.e., non-equal magnitude and opposite polarity), so that pivoting mirror 28 pivots between first and second pivoted positions that are at unequal pivot angles on opposite sides of the optical axis. Such a drive signal may be useful, for example, to properly align the image based on the user's distance from the image.

The pulse voltage can be calibrated in diopters by relating deflection angle 29 (FIG. 4A) (and deflection angle 29' (FIG. 4B)) produced by pivoting mirror 28 to the angular deviation produced by a wedge prism. The power A of a wedge prism can be expressed in diopters, with 1 prism diopter equal to a deflection of 1 cm at a distance of 100 cm from the prism. Thus $$A = 100 * \tan(\alpha) \tag{1}$$

where, $\alpha$ is the deflection angle in degrees. The required deflection angle $\alpha$ (in degrees) can be computed for a given diopter power A:

$$\alpha = \arctan\left(\frac{A}{100}\right) \tag{2}$$

For example: For a prism power A=7 diopters, the deflection angle $\alpha$=4°. Because deflection angle 29 is twice pivot angle 27 for the system shown in FIGS. 4–6, pivoting mirror 28 must pivot 20 for a 7 diopter image shift.

Actual tests on patients with central vision loss have shown diopter shifts A of 7 to 14 diopters. Using equation (2), this relates to deflection angles $\alpha$ of 4° and 7.97° respectively. Thus, for the system of FIGS. 4–6, a pivot angle 27 of 2° and 3.98° will produce 7 and 14 diopter shifts, respectively.

Referring again to FIG. 7, pulse period T is the amount of time between successive image shifts. Pulse repetition rate f, measured in pulses per second, equals the inverse of pulse period T. Repetition rate f preferably is about 1–7 pulses per second, and most preferably about 3 pulses per second. Pulse duration T controls the amount of time during which pivoting mirror 28 shifts the image. Preferably, T is about 0–50% of pulse period T.

Figure 9:
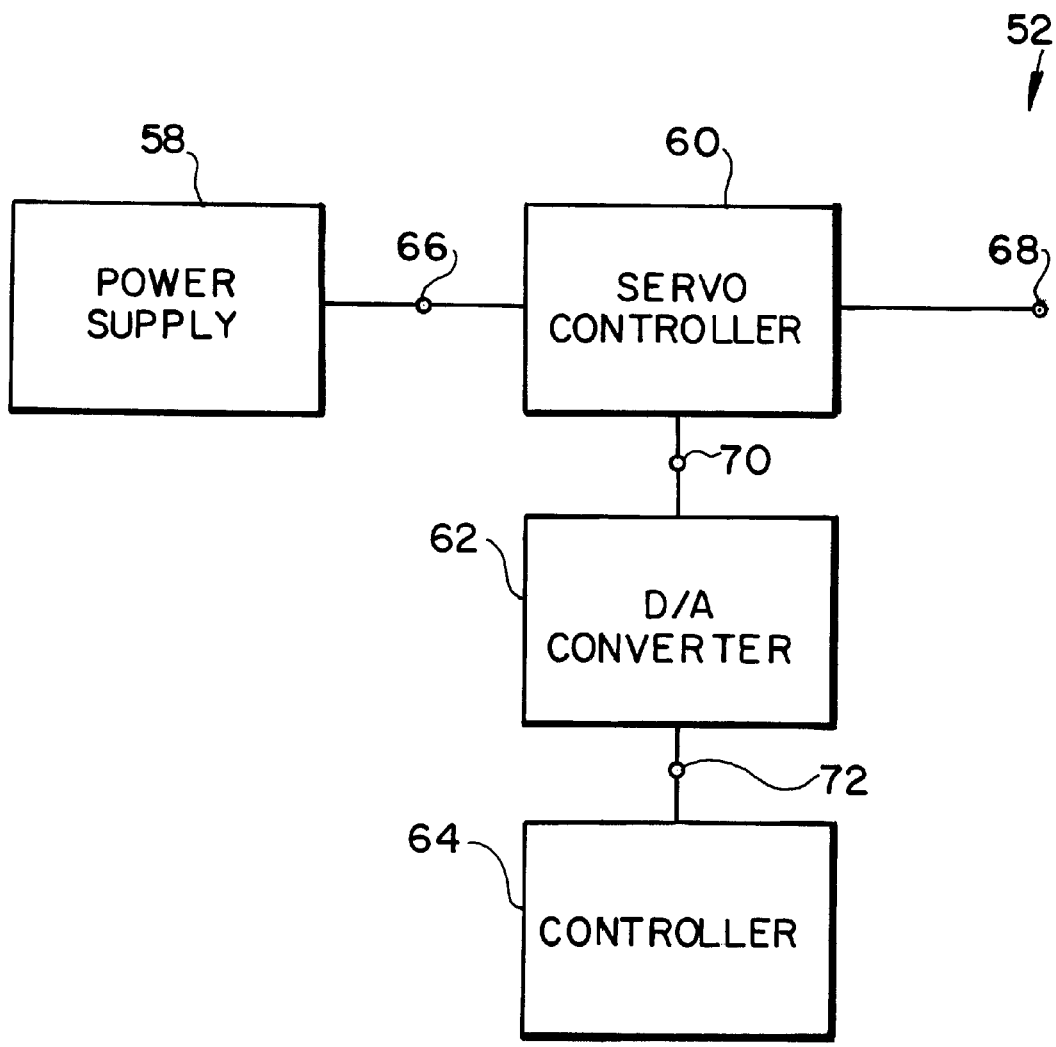
FIG. 9 is a block diagram of control circuitry in accordance with the present invention.

Referring to FIG. 9, a block diagram of control circuit 52 is described. Control circuit 52 includes power supply 58, servo controller 60, digital-to-analog (D/A) converter 62 and controller 64. Although illustrated as separate blocks in FIG. 9, power supply 58, servo controller 60, D/A converter 62 and controller 64 may comprise separate circuit elements, or may be integrated as a single circuit element.

Power supply 58 provides regulated DC power to servo controller 60 at terminal 66. Power supply 58 may be a linear or switching regulator. For example, power supply 58 may be implemented using model number UV430-4, manufactured by TRI-MAG, Inc., Visalia, Calif. Alternatively, power supply 58 may be a battery or other similar source of DC power.

Servo controller 60 couples to power supply 58 at terminal 66 and to D/A converter 62 at terminal 70. In response to analog control signals at terminal 70, servo controller 60 provides drive signals 54 (and/or 56) at terminal 68 to drive motor 44. Servo controller 60 preferably is lightweight, and provides drive signals 54 that have rapid rise and fall times, minimal overshoot and undershoot, and high repeatability (i.e., drive signal waveshapes that do not appreciably vary over time).

Additionally, servo controller 60 preferably includes an absolute encoder that accurately identifies the position of drive shaft 49, so that pivoting mirror 28 always returns to the same position (e.g., position 33). Servo controller 60 may, for example, be implemented using the MiniSAX Micro MO Assembly number 310-185071, manufactured by General Scanning.

Controller 64 and D/A converter 62 provide analog control signals at terminal 70 for servo controller 60. In particular, controller 64 provides digital control signals at terminal 72 to D/A converter 62, which converts the digital signals to analog signals and then provides the analog control signals at terminal 70 to servo controller 60. D/A converter 62 preferably provides a linear response with respect to a DC voltage, so that the pulse voltage of drive signal 54 (and/or 56) has a linear relationship to diopter values.

Controller 64 may be a laptop or notebook computer that includes software for providing digital control signals at terminal 72. In particular, the software includes function generator features that may be used to specify the peak amplitude, pulse duration τ and pulse period T of the drive signal provided by servo controller 60. A suitable laptop or notebook computer, for example, is the Dell Inspiron 3200, manufactured by Dell Computer Corporation, Austin, Tex. Suitable software includes, for example, LabVIEW version 5.0, manufactured by National Instruments, of Dallas, Tex. Alternatively, controller 64 may comprise a microprocessor, digital signal processor, or similar device that is programmed to provide digital control signals at terminal 72.

D/A converter 62 converts digital control signals at terminal 72 to analog control signals at terminal 70. D/A converter 62 may, for example, be implemented using the DAQCard 1200, manufactured by National Instruments. D/A converter 62 may be coupled to controller 64 by any suitable means, such as via Personal Computer Memory Card International Association (PCMCIA) interface. Alternatively, D/A converter 62 may be included as part of controller 64, such as a microprocessor, digital signal processor or similar device that includes A/D converter circuitry.

A person of ordinary skill in the art will recognize that control circuit 52 could be substantially miniaturized and included as part of spectacles 38. For example, control circuit 52 could be manufactured in integrated circuit technology and packaged in a small, clip-on device similar to a small hearing aid device.

In addition, a person with central vision loss may prefer shifting the image along an axis other than horizontal. For example, by rotating the fixed mirror, pivoting mirror and motor shown in FIGS. 4A and 4B by 90°, the apparatus can be used to shift an image along a vertical axis above (or below) optical axis 20.

Further, by rotating the fixed mirror, pivoting mirror and drive motor by some other angle, the apparatus can be used to shift an image along any axis relative to the optical axis 20. In this regard, a laser scanning opthalmascope (SLO) can be used to determine a preferred retinal locus (PRL), i.e., the most responsive portion of the retina. Apparatus in accordance with the present invention then can be used to shift the image to the PRL.

The foregoing merely illustrates principles of the present invention. Persons skilled in the art may modify the invention without departing from the scope and spirit of the invention.

What is claimed is:

1. Apparatus for directing an image onto a retina of an eye, the apparatus comprising:
   a first reflective surface adapted to receive the image;
   a drive motor coupled to the first reflective surface, the drive motor continuously pivoting the first reflective surface back and forth at a rate of about 1–7 cycles per second between first and second pivot positions to direct the image to first and second positions on the retina.

2. The apparatus of claim 1, wherein the first reflective surface comprises a mirror.

3. The apparatus of claim 1 further comprising a second reflective surface adapted to generate and reflect the image to the first reflective surface.

4. The apparatus of claim 3, wherein the second reflective surface comprises a mirror.

5. The apparatus of claim 3, wherein the second reflective surface is disposed at a substantially fixed position relative to the eye.

6. The apparatus of claim 1, wherein the first position on the retina is substantially a damaged portion of the retina.

7. The apparatus of claim 1, wherein the second position on the retina is substantially an undamaged portion of the retina.

8. The apparatus of claim 1, wherein the drive motor pivots at a predetermined rate.

9. The apparatus of claim 8, wherein the predetermined rate substantially prevents the eye from shifting the directed light to one of the first or second positions on the retina.

10. Apparatus for directing an image onto a retina of an eye, the apparatus comprising:
    spectacles;
    a first mirror coupled to the spectacles, the first mirror adapted to receive the image;
    a drive motor coupled to the spectacles and to the first mirror, the drive motor continuously pivoting the first mirror back and forth at a rate of about 1–7 cycles per second between first and second pivot positions to direct the image to first and second positions on the retina.

11. The apparatus of claim 10 further comprising a second mirror adapted to generate and reflect the image to the first mirror.

12. The apparatus of claim 11, wherein the second mirror is disposed at a substantially fixed position relative to the eye.

13. The apparatus of claim 10, wherein the first position on the retina is substantially a damaged portion of the retina.

14. The apparatus of claim 10, wherein the second position on the retina is substantially an undamaged portion of the retina.

15. The apparatus of claim 10, wherein the drive motor pivots at a predetermined rate.

16. The apparatus of claim 15, wherein the predetermined rate substantially prevents the eye from shifting the directed light to one of the first or second positions on the retina.

17. The apparatus of claim 10 further comprising control circuitry coupled to the drive motor, the control circuitry controlling the pivoting of the first mirror.

18. The apparatus of claim 17, wherein the control circuitry causes the drive motor to pivot at a predetermined rate.

19. A method for improving the visual perception of an image, the method comprising continuously shifting the image back and forth at a rate of between 1–7 cycles per second between first and second portions on a retina of an eye.

20. The method of claim 19, further comprising shifting the image at a predetermined rate.

21. The method of claim 20, wherein the predetermined rate substantially prevents the eye from shifting the directed light to one of the first or second positions on the retina.

22. A method for directing an image onto a retina of an eye, the method comprising:

providing a first reflective surface adapted to receive the image;

continuously pivoting the first reflective surface back and forth at a rate of about 1–7 cycles per second between first and second pivot positions to direct the image to first and second positions on the retina.

23. The method of claim 22, wherein the first position on the retina is substantially a damaged portion of the retina.

24. The method of claim 22, wherein the second position on the retina is substantially an undamaged portion of the retina.

25. The method of claim 22, further comprising pivoting at a predetermined rate.

* * * * *

UNITED STATES PATENT AND TRADEMARK OFFICE
CERTIFICATE OF CORRECTION

PATENT NO. : 6,155,682  
DATED : December 5, 2000  
INVENTOR(S) : Stanley P. Steinberg et al.

Page 1 of 1

It is certified that error appears in the above-identified patent and that said Letters Patent is hereby corrected as shown below:

Title page,
Add the following references to the "References Cited" section:
-- 5,233,373  8/1993  Peters et al.
5,653,751  8/1991  Samily et al. --

Column 5,
Lines 20 and 43, "duration T" should be -- duration t -- (Greek letter tau).
Lines 39 and 63, "is" should be deleted.

Column 6,
Line 33, "20" should be -- 2° --.
Line 45, "duration T" should be -- duration t -- (Greek letter tau).
Line 46, "T is about" should be -- t is about -- (Greek letter tau).

Signed and Sealed this

Twenty-third Day of October, 2001

Attest:

NICHOLAS P. GODICI
*Attesting Officer*  *Acting Director of the United States Patent and Trademark Office*